Feb. 15, 1966  J. E. KACHNIK ETAL  3,234,669
MOUNTING STRUCTURE FOR ADJUSTABLY SUPPORTING A SCRAPER
Filed June 24, 1963  3 Sheets-Sheet 1

INVENTORS
JOSEPH E. KACHNIK
VICTOR N. FARHI
ALBRECHT E. MEYER
BY
Albert L. Peffers
ATTORNEY

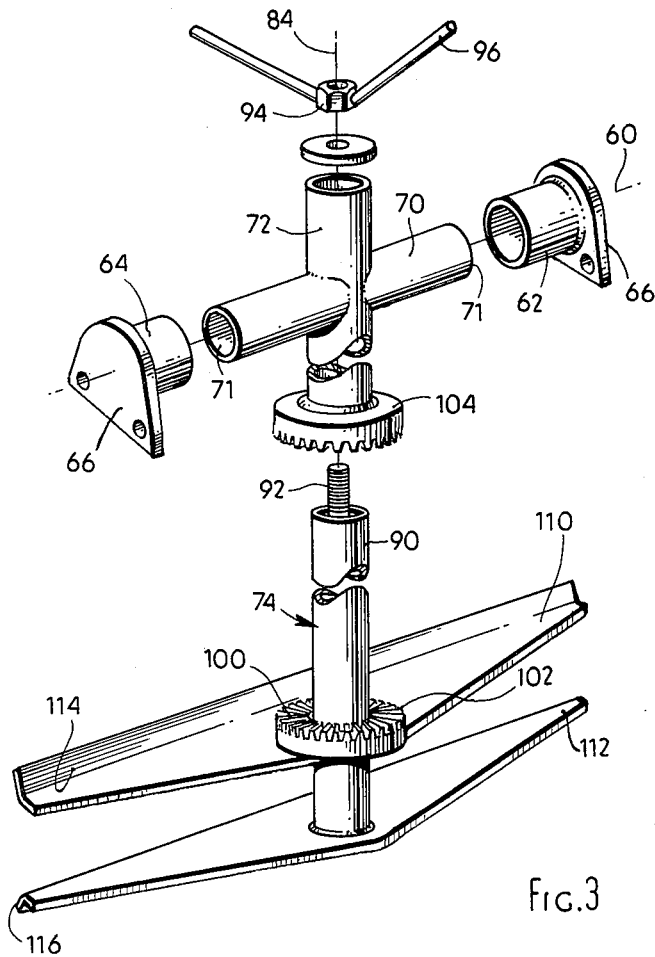

INVENTORS
JOSEPH E. KACHNIK
VICTOR N. FARHI
ALBRECHT E. MEYER
BY Albert L. Jeffers
ATTORNEY United States Patent Office 3,234,669
Patented Feb. 15, 1966

3,234,669
MOUNTING STRUCTURE FOR ADJUSTABLY
SUPPORTING A SCRAPER
Joseph E. Kachnik and Victor N. Farhi, Fort Wayne, and
Albrecht E. Meyer, Waterloo, Ind., assignors to Hendrickson Tandem Corporation, Butler, Ind., a corporation of Indiana
Filed June 24, 1963, Ser. No. 289,992
1 Claim. (Cl. 37—143)

This invention relates to a mounting structure for implements, and more particularly to adjustable mounting means for disposing a tool in any one of several different positions whereby its round position, angle of attack, attitude and skew position can be readily varied and maintained while it is being moved by a drawing vehicle.

It is highly important, to vary at will the position of a working tool such as a grader blade in order to accomplish different working operations. It is of considerable importance, in carrying out various grader operations, to vary the working positions of the grader blade in accordance with soil conditions or in accordance with a particular grading operation which is being accomplished. It is necessary, not only to change the working height of the grader blade, but also to vary its attitude, that is, the angle of attack which it presents to the graded material in the direction of forward movement of the blade, and also to vary the attitude of the blade, i.e., its angularity with respect to a vertical axis, this being a factor which controls the amount of moving which is accomplished at any one phase of grader operation.

All of these described factors are important and it is one of the primary considerations of the present invention to provide a mounting structure for a tool such as a scraper blade or the like, which is capable of effecting multiple adjustments in a readily convenient manner whereby the tool can be positioned in any one of several different positions varying in pitch (angle of attack), attitude, elevation and yaw to suit the particular conditions of use.

It is a further object of the present invention to provide a mounting structure which can be operated remotely to change the position of the tool to an optimum location, and moreover, to vary the tool position so that one or the other of the ends of the tool, as for example a grader blade is tipped downwardly, making the tool effective for "ditching" or furrowing operation.

A still further object of the present invention, is to provide a tool positioning apparatus which, once having positioned the tool, will maintain this position regardless of various stresses which are imposed on the mounting structure and which often times tend to create free play in the tool position after extended use. Unlike such previous shortcomings, it is an important feature of the present invention that a tool position once defined, is maintained steadfastly without change or development of free play.

A still further object of the present invention, is to provide a tool-positioning and tool-transporting device capable of effecting plural adjustments, and which is especially adapted for use with a three point hitch linkage on a tow vehicle such as a tractor, truck, or the like.

Other objects and features of the present invention will become apparent from a consideration of the following description, which proceeds with reference to the accompanying drawings, wherein:

FIGURE 3 is an enlarged exploded view of the mounting and adjusting mechanism for varying the attitude of the blade or other tool, about a horizontal and a vertical axis;

Figure 5:
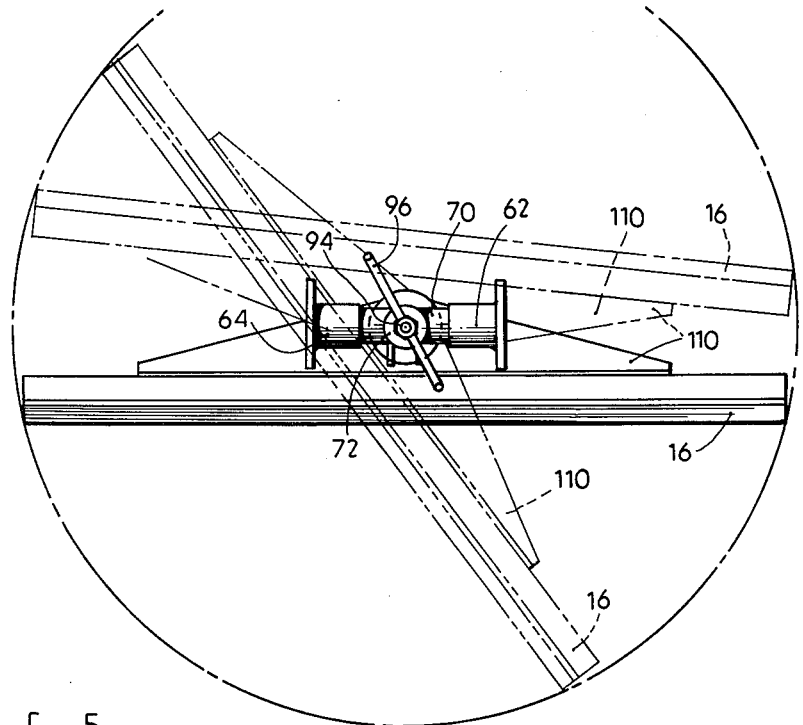
Figure 6:
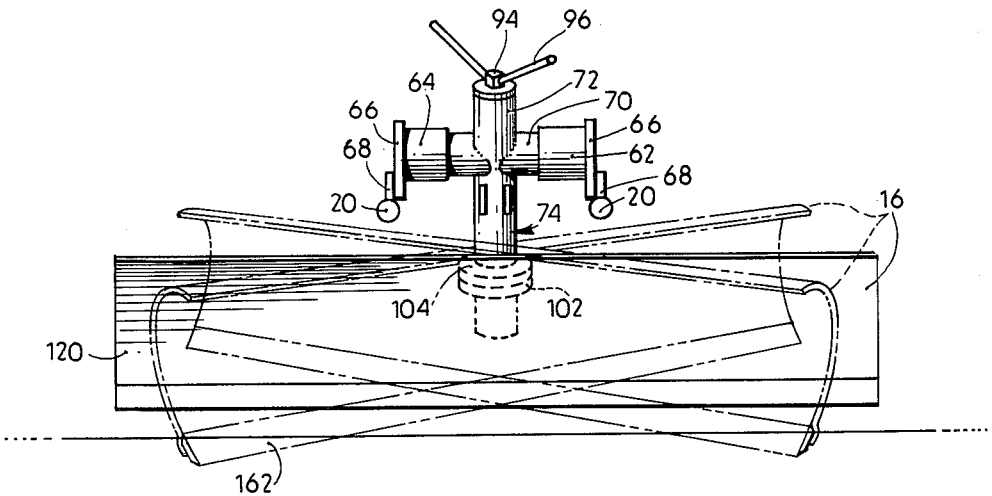

FIGURE 4 is a composite detail view showing how the grader blade can be turned about a horizontal axis, illustrating in full line view the angle of attack of the blade in one position of the mounting structure about its horizontal axis, and the dotted line positions illustrating how the angle of attack for the blade can be varied by turning the mounting structure about the horizontal axis both in a clockwise and counterclockwise direction;

FIGURE 5 illustrates the different attitudes of the blade which are effected by turning the blade about a vertical axis, the view looking downwardly from FIGURE 3; and, FIGURE 6 illustrates the different tilt or pitch angles of the tool, effected by lowering one or the other ends of the blade.

Referring now to the drawings, a tow vehicle designated generally by reference numeral 10 includes a three point hitch linkage 12 which provides a tow connection between the vehicle 10 and support frame 14 which supports a tool such as a scraper 16 or the like, and is adapted to position the scraper in various working positions.

The frame 14 comprises a generally horizontal tubular member 20 from which depends a tool 16 and includes at its extended end a ground-supporting wheel 22 and at the other end a U-shaped support blacket 24. The frame is secured to a three point hitch linkage through pivot connections 26, 28 and 30 which fasten to linkages 34, 36 and 38 respectively.

The angle 40 between brackets 24 and frame 14 is variable by fitting the ends 42, 44 of struts 46, 48 into a selected one of openings 50, thereby establishing the clearance of scraper blade 16 from the ground. Once this clearance is established, it will be maintained constant by reason of the operation of the three point hitch linkage, regardless of the movement of the tractor 10 over uneven terrain. The weight of the scraper blade 16 is borne in part through the three point hitch linkage and in part through the ground-engaging wheel 22.

After an adjustment for the vertical height of the blade is effected, the axle 51 for the castearable wheel 22 is adjusted upwardly and downwardly through the journal 52 and is locked in placed by one of the adjusting openings 54 so that the weight of the blade is borne evenly between the tire 56 of the wheel and the hitch linkage. When the trailing wheel 22 is used, the third link of the three point hitch is disconnected; conversely when the wheel 22 is not used the third hitch of the three point hitch linkage is connected. The blade 16 can be swung about a horizontal axis 60 (FIGURES 3, 4), said axis being defined by journal sleeves 62, 64 having flanges 66 which attach to openings 50 of flanges 68, secured to frame 14. A tubular shaft 70 having opposite ends 71 fits telescopically within sleeves 62 and 64 and forms a journal for pivotal movement to swing the cross member 72 and its depending structure 74 having blade 16 thereon through different angular positions defining the angle of attack (FIGURE 4) for the blade 16. These different angular positions are produced by an elongatable strut 76 which may be hydraulically (not shown) operated and which is attached at one end to clevice 78 and at the other end 80 to cross member 72 through lugs 82. Thus, when the strut 76 is extended the blade is swung clockwise (FIGURE 4) about axis 60 and when the strut 76 is shortened, the blade is swung counterclockwise about axis 60.

The particular angle of the blade 16 (FIGURE 4) is termed the "angle of attack" and is a funcion of the kind of material being displaced by the blade during translation of the blade.

The blade has a further position, referred to as the "attitude" of the blade (FIGURE 5) i.e., the position of the blade about vertical axis 84 (FIGURE 3) which defines the angle the blade makes to the forward line of movement. When the blade is positioned 90° to the direction of forward movement, it displaces a maximum amount of material; and, as the blade is moved successively clockwise or counterclockwise from the perpendicular to the line of forward movement, the blade displaces successively less material, merely pushing the material aside in one direction or the other.

The preferred attitude of the blade is maintained by means of the shaft 90 having a threaded stud 92 at the end thereof extending upwardly through the interior of the cross member 72 with the stud 92 then being connected to nut 94 having wing handles 96 by which the nut 94 can be screwed down over the threaded stud 92 to draw the gear teeth 100 formed on a flange 102 of shaft 90 into interfitting relation with complementary opposed gear teeth 104 at the bottom of cross member 72. The interlocking teeth prevent relative angular movement between the member 72 and shaft 90. Adjustable angular movement is effected by simply loosening the nut 94 enough to disengage the gear teeth 100 and 104 and then rotating the shaft 90 and blade 16 by whatever amount is desired whereupon the nut 94 is again tightened and the teeth 100, 104 reengaged to maintain the attitude of the blade. Because the teeth tightly interlock, there is no opportunity for the blade to oscillate and thereby form brinneling which could result in free play of the blade. Instead, the blade is fixed firmly in place and cannot oscillate in spite of the considerable resistance which is offered to movement of the blade from one end to the other, tending to effect brinneling.

At the bottom of the shaft 90 are two transverse mounting arms 110 and 112 having inclined edges 114 and 116 which serve as mountings for blade sections 120 and 122, the blade section 120 being directly affixed by means of bolts 126 and the other blade section 128 being coupled by bolts 130 to the main blade section 120.

By means of the described controls, it is thereby possible to control the vertical displacement of the blade 16, the angle of attack (FIGURE 4) and the attitude (FIGURE 5). In addition, it is possible to control the skew or pitch angle of the blade so that one or the other end of the blade can be caused to dig into the ground causing a furrowing or ditching action. This last mentioned adjustment is effected by a combination of turning the blade on its vertical axis 84 (FIGURE 5) and then rotating it about its horizontal axis 60 (FIGURE 3). Thus, if the right edge of the blade (FIGURE 6) is to be depressed into the ground, the blade is swung clockwise (FIGURE 5) about axis 84 and then swung clockwise about axis 60 (FIGURE 4) thus dropping the right end of the blade (FIGURE 6) and raising the left hand end of the blade. Conversely, if the left hand end of the blade (FIGURE 6) is to be the furrowing end of the blade, the blade is rotated counterclockwise (FIGURE 5) and clockwise (FIGURE 4). Thus, by a combination of the movements of the blade about its horizontal and vertical axis, it is possible to vary the skew of the blade as well as its attitude and angle of attack.

Figure 1:
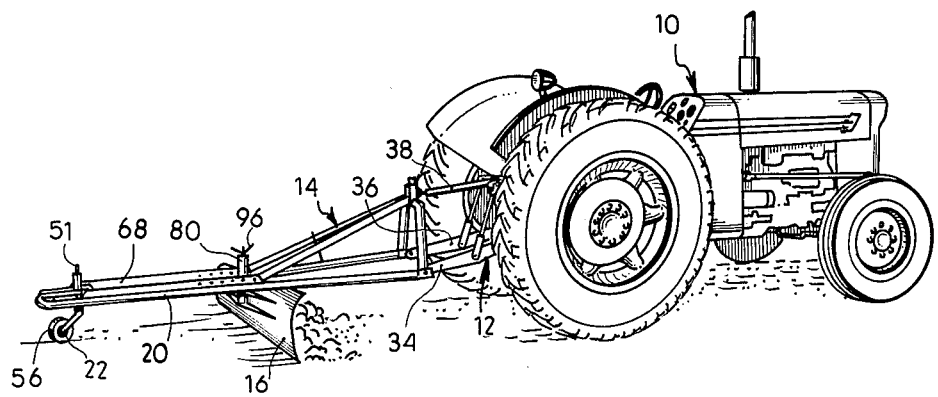
FIGURE 1 is an isometric view of a tractor having a tool support linkage constructed in accordance with the present invention.
Figure 2:
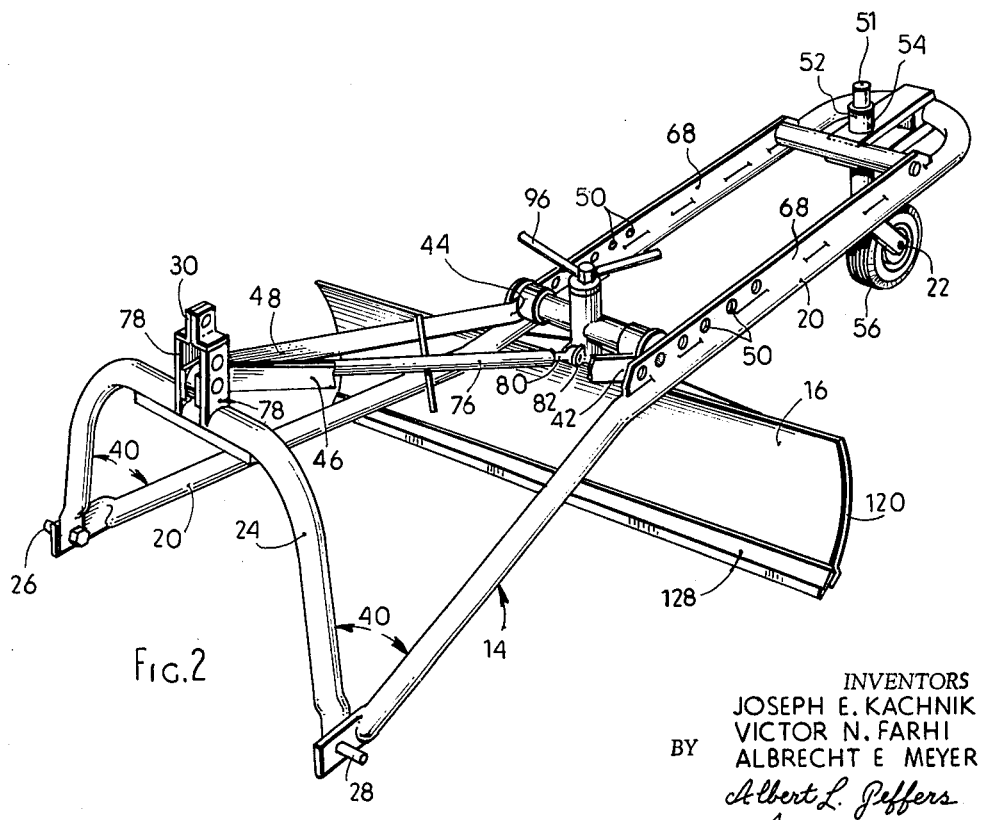
FIGURE 2 is an enlarged isometric detail view of the tool support linkage illustrated in FIGURE 1, but detached from the tow vehicle.

In operation, the frame 14 is coupled with the three point hitch linkage 12 through pivot connections 26, 28 and 30 to the draw bars 34, 36 and 38. The blade 16 is then adjusted to be at the correct vertical height by adjusting the angle 40 (FIGURE 2) by fitting the ends 42, 44 into a suitable one of openings 50, the blade 16 being adjusted to a higher position by fitting the ends 42, 44 into openings which are in the direction of the projected end of the frame 14 and decreasing the angle 40; or, lowering the blade 16 is accomplished by increasing the angle 40 by fitting the ends 42, 44 into openings 50 which are closer to the tow vehicle.

Once the blade 16 is located at the proper height, the projected end of the frame is additionally supported by the tire 56 on the casterable wheel 22 by moving the axle 50 downwardly or upwardly and then maintaining that position by adjustment openings 54 which are formed in journal 52. In this way, the weight of the blade 16 is borne approximately evenly between the three point hitch linkage and the ground-supporting tire 56. The described operation can be done either manually, or it is possible to effect it remotely by using hydraulically operated links in place of the struts 46, 48, the links being extendible or contractible by hydraulic means in a manner well known in the art. Typically, two telescopically fitted members are caused to operate hydraulically to vary the angle 40. The advantage of such a system is that the driver of the vehicle 10 can vary the vertical position of the blade 16 at will.

Depending upon the grade of the material being translated, it is next possible to vary the angle of attack of the blade 16 to provide a shallower or deeper advance against the material being moved. For some operations, there is preferred an acute or deep pitch of attack and therefore the blade is moved clockwise about axis 60 (FIGURE 4) to the left hand position of the blade. For maximum displacement of material, the blade is moved to a perpendicular position wherein cross member 72 is approximately perpendicular to the ground; and, where a cutting action is required on the ground or other material, the blade is turned counterclockwise to the right hand position shown in FIGURE 4. All of these positions are obtainable by means of extending or contracting the adjustable strut 76 which is connected between lug 80 of cross member 72 and bracket 78, the strut 76 being elongated to effect the left hand position of the blade in FIGURE 4 or shortened to obtain the right hand position of the blade in FIGURE 4. While the blade is being advanced against the resistance of the material, the blade tends to turn clockwise about axis 60 (FIGURE 4) and therefore the adjustable strut 76 is stressed in tension.

The attitude of the blade is changeable by turning handle 96 and loosening nut 94 on threaded stud 92 which disengages the interlocking gear teeeth 104 on cross member 72 and gear teeth 100 on shaft 90 thereby permitting the blade 120 to turn angularly about the vertical axis 84. At the preferred angle of attack, the handle 96 is turned to tighten the nut 94 on threaded stem 92, reengaging the teeth 100 and 104 whereby the blade 16 is locked in a given attitude and is prevented from oscillating or brinneling by reason of the interlocked connection. In previous embodiments, the blade 16 tended to vibrate after a period of time because of the free play of the blade 16 and causing an unstable condition of the blade 16. In the present invention, the blade is firmly locked in position and such movements are effectively prevented.

To change the yaw or tilt of the blade, causing one or the other ends of the blade to dig into the material being moved, (FIGURE 6) it is only necessary to effect a combination of movements of the blade about its horizontal and vertical support axes. To lower the right hand end of the blade, the blade is turned clockwise (FIGURE 5) about its vertical axis and then about its horizontal axis into the plane of the paper (FIGURE 6); or, to lower the left hand end of the blade, the blade is turned counterclockwise (FIGURE 5) and then rotated into the plane of the paper (FIGURE 6).

The various adjustments, can occur either manually or hydraulically. It is possible for the operator to achieve any one of the many different blade positions which are best suited for a particular grade of material and a particular grading operation, including changes of the angle of attack, attitude pitch and height, all of which are essential to take into account in performing a complete grading operation. Once these various positions are obtained, they are rigidly maintained with relative ease. The linkages 34, 36, 38 can also be varied in length by using telescoping hydraulically operated members to effect adjustment of the tool position.

Also, the structure for accomplishing this change in position is relatively simple, economical to produce and operate, yet it is durable and is not easily subject to breakage or malfunctioning.

The described mounting can also be used with other vehicles such as trucks or the like and the tool may be a bulldozer tool, road grader or the like.

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention to suit individual design requirements and it is intended that such changes which incorporate the herein disclosed principles will be included within the scope of the following claim as equivalents of the invention.

We claim:

In a scraper attachment for tractors having transversely spaced rearwardly extending draw bars and a power lift having operating connections to said draw bars comprising in combination, a scraper supporting frame having a pair of rearwardly extending transversely spaced generally horizontal tubular members having hingedly secured to its front end the rear ends of said draw bars, an upwardly extending generally inverted U-shaped support bracket transversely hinged at its lower ends to the forward ends of said scraper frame, its upper end having a stablizing link pivotally connected to the frame of the tractor, said tubular members including a pair of transversely spaced flanges having a plurality of longitudinal spaced and transversely aligned openings therein, a pair of bracing struts pivotally connected to the upper end of said support bracket at one end and adjustably connected to transversely aligned openings in said flanges at the other end for changing the height of the rear end of the scraper frame relative to its front end, a pair of journal members having spaced openings corresponding to the spaced openings on said flanges connected to said flange in transversely aligned relationship, a first shaft having a substantially vertically extending hollow cross member rotatably carried by said journals, a second shaft rotatably carried by said cross member and having a pair of spaced mounting arms, a scraper blade carried by said mounting arms, an adjustable rod connected at one end to the upper portion of said support bracket and at the other end to the cross member for rotating the first shaft in said journals to change the tilt of said scraper blade, said second shaft and cross member being provided with a pair of flanges having opposed gear teeth formed thereon, and clamping means mounted on said cross member and second shaft for locking said opposed gear teeth in selected positions to change the angle of the scraper blade.

References Cited by the Examiner

UNITED STATES PATENTS

| | | | |
|---|---|---|---|
| 242,659 | 6/1881 | Lasher | 37—156 |
| 2,346,757 | 4/1944 | Horner | 172—447 X |
| 2,710,467 | 6/1955 | Cundiff | 37—159 |
| 2,740,212 | 4/1956 | Collins | 37—156 |
| 2,762,140 | 9/1956 | Elfes | 37—159 |
| 2,815,591 | 12/1957 | Mattingly | 37—180 X |
| 2,822,628 | 2/1958 | Arps | 37—156 X |

FOREIGN PATENTS 502,917 of 1928 Germany.

ABRAHAM G. STONE, *Primary Examiner.*

BENJAMIN HERSH, T. GRAHAM CRAVER,
*Examiners.*